United States Patent [19]
Manning

[11] 3,968,341
[45] July 6, 1976

[54] WELDING TORCH WITH INTEGRAL CURRENT CONTROL

[75] Inventor: Richard William Manning, Whitehall, Pa.

[73] Assignee: Air Products and Chemicals, Inc., Allentown, Pa.

[22] Filed: Aug. 9, 1974

[21] Appl. No.: 496,052

[52] U.S. Cl............................... 219/132; 219/130; 219/136
[51] Int. Cl.$^2$........................................ B23K 9/10
[58] Field of Search ............. 219/75, 132, 130, 136, 219/138; 338/178

[56] References Cited
UNITED STATES PATENTS

| | | | |
|---|---|---|---|
| 2,425,183 | 8/1947 | Hall | 219/132 X |
| 2,658,132 | 11/1953 | Welch | 219/132 |
| 2,931,890 | 4/1960 | Bernard | 219/130 |
| 2,993,972 | 7/1961 | Stewart | 219/138 |
| 3,477,005 | 11/1969 | Weems | 219/132 X |
| 3,497,857 | 2/1970 | Pfeufer | 338/178 |
| 3,521,023 | 7/1970 | Dahlman et al. | 219/75 |

*Primary Examiner*—Bruce A. Reynolds
*Assistant Examiner*—Clifford C. Shaw
*Attorney, Agent, or Firm*—James C. Simmons; Barry Moyerman

[57] ABSTRACT

A welding torch handle including electrical control means thus enabling a welder, by the control on the handle, to vary the welding current supplied to an electrode in the torch head fitted to the handle. The handle is characterized by employing a linearly actuated control that can continuously vary current applied to the electrode from 0 amps to the full setting on the welding power supply. This control eliminates foot, hand held, or motor driven controls and provides convenient single-handed current control by the welder.

4 Claims, 4 Drawing Figures

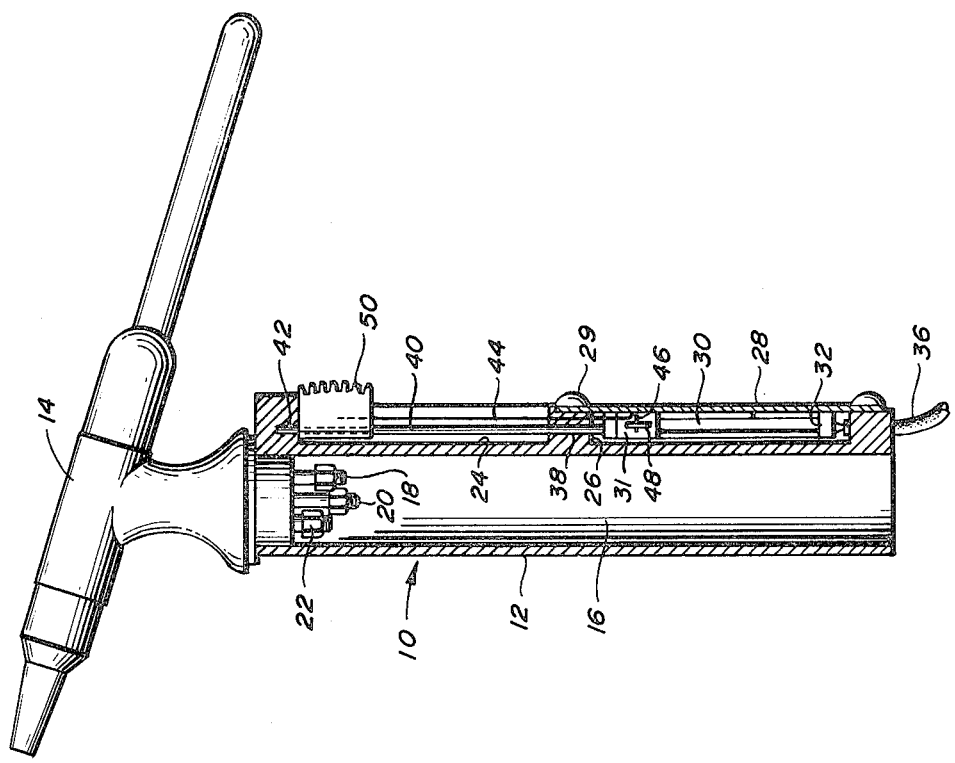
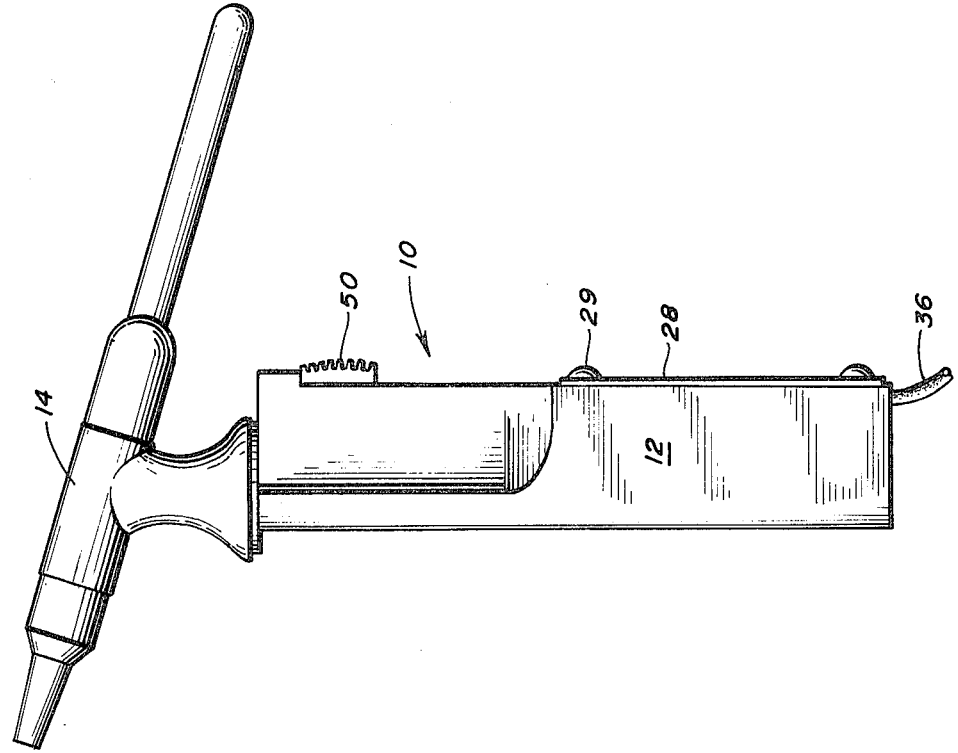

WELDING TORCH WITH INTEGRAL CURRENT CONTROL

BACKGROUND OF THE INVENTION

This invention pertains to handles for hand operated arc welding torches. The handle may be adapted for hand torches of the type generally referred to as tungsten inert gas (TIG), metal inert gas (MIG), and plasma types.

Prior art hand operated welding torches, having current control on the handle, are exemplified by U.S. Pat. Nos. 2,425,183, 2,484,959, 2,658,132, and 3,521,023. Each of the patentees show a device on the torch or torch handle for varying welding current applied to the electrode held by the torch.

In the first three patents, control is achieved by a knob or rotatable portion of the torch handle, while in the last reference, adjustment is achieved by a thumb wheel in the forward portion of the handle. The first three devices require either two-handed operation or awkward positioning of the welder's hands while the last patent provides for a device with an opening in the torch handle, thus exposing the welder to shock by virtue of high frequency current which may be used within the torch.

SUMMARY OF THE INVENTION

In order to overcome the problems with the prior art devices and to provide an improved welding torch handle, it has been discovered that a torch handle can be constructed with a linearly actuated control device on the handle, which control device is insulated from the major sources of electrical current. The control device can be coupled to a variable current welding power supply thus providing for current control of the current impressed on the electrode in the torch from 0 amperes to full output amperage as denoted on the welding current power supply. The torch handle of the instant invention provides for current control by the welder (operator) at the torch without moving the torch in the hand and is most easily affected by use of the welder's thumb. The torch handle eliminates hand operated belts hung, or pocket carried controls, or foot operated controls of the type prevalent in prior art devices.

Therefore, it is the primary object of this invention to provide an improved welding torch handle including a control for affecting control of the welding current at the torch handle.

It is another object of this invention to provide an improved welding torch with thumb control of the welding current.

It is still another object of this invention to provide an improved tungsten inert gas (TIG) welding torch.

It is yet another object of this invention to provide a torch handle that can be easily adapted to conventional metal inert gas, tungsten inert gas, or plasma welding torch heads, thus providing for hand operated welding current control at the torch handle.

BRIEF DESCRIPTION OF THE DRAWING

FIG. 1 is a side elevational view of a torch handle according to the present invention and showing a tungsten inert gas head affixed to the handle.

FIG. 2 is a longitudinal view of the torch of FIG. 1 with the torch handle partially sectioned to reveal interior details thereof.

DETAILED DESCRIPTION OF THE PREFERRED EMBODIMENT

Figure 4:
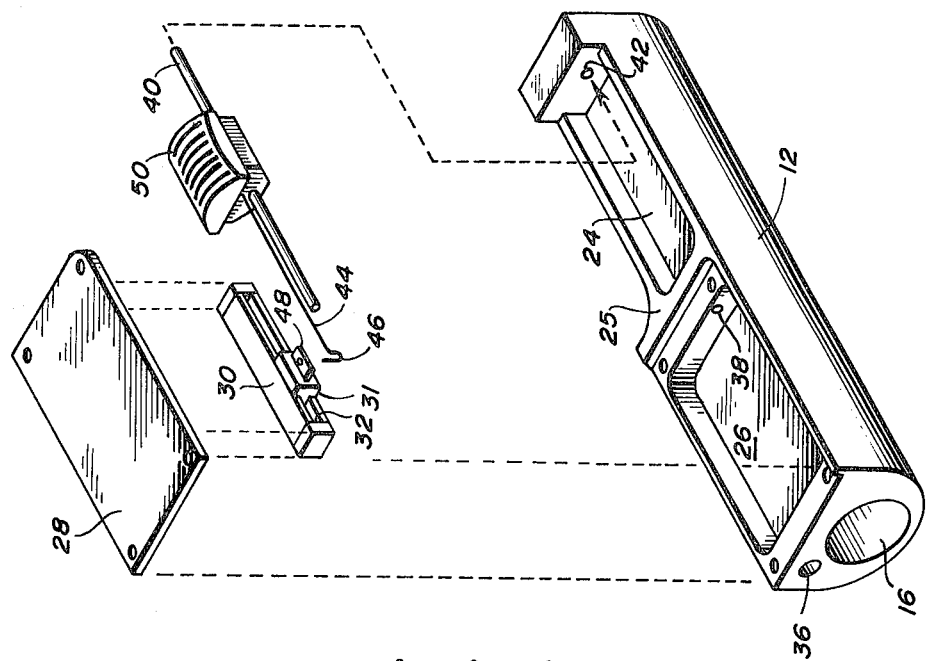
FIG. 4 is an isometric exposed view of a handle according to the present invention.

It has long been desired to achieve a hand operated welding torch which can provide for control of the welding current by the operator without the operator physically stopping the weld and setting the controls which are normally found on the welding machine or power supply. The prior art is replete with various types of devices to achieve this end. Broadly, they fall into three categories, (1) those which have a control on the handle as delineated above, (2) those which employ a foot switch, and (3) those which employ a hand operated switch normally carried in a welder's pocket or affixed to his clothing such as on a belt loop.

The torch handle operated devices were set out above and are illustrated by U.S. Pat. Nos. 2,425,183, 2,484,959, 2,658,132, and 3,521,023. The first of the aforementioned patents employs a low power rheostat and a switch; however, the switch is located on the end of the torch furthest from the end gripping the electrode and cannot be operated without interrupting the work. In addition, in order to achieve a full range adjustment, several motions of the hand are required.

The second of the patents requires a rotation of a portion of the torch handle which may be inconvenient or slow and which cannot be done while the welding torch is in the operating mode. The device also features a variable strength solenoid coil which operates on a spring-loaded rheostat.

The third of the patents is a device that is built into the rear portion of the torch. Here again, adjustment of the control is awkward, requiring two hands, with the weld current control accomplished via a saturable reactor.

The last of the above-named patents contains an adjustment knob that is partially concealed by the handle and which may be difficult to operate by a welder with bulky gloves. Furthermore, several strokes of the thumb are required to provide for continuous adjustment. The control does not feature an on/off switch as an integral feature and it requires a specially built torch head and handle. Furthermore, this torch does not have a continuous wall between the welding current electrical connections and the control knob, thus exposing the weld operator to potential electrical shock from high frequency arc starting circuits commonly employed in hand operated arc welding torches.

A second type device employing a motor driven rheostat or a solenoid operated rheostat is exemplified by U.S. Pat. Nos. 1,948,377, 2,043,331, 2,305,206, 2,383,725, 3,041,526, 3,402,341, and 3,609,291. These devices are examples of the most commonly employed control devices wherein a solenoid actuated or a motor driven rheostat is used to provide current control, either with push-botton switches on the torch or foot switch operated by the operator.

The third group is exemplified by U.S. Pat. No. 2,642,515, which is a pocket carried by the operator connected to a motor which drives a rheostat to control welding current.

As delineated above, the device of the present invention enables the operator to actuate at the contactor or continuously vary the welding current through any given range or portion thereof by a simple motion of his thumb while wearing gloves and without interrupting the work. The ability to adjust while welding is especially important in tungsten inert gas (TIG) welding to avoid tungsten inclusions. A skilled tungsten inert gas welder can tell by the arc whether it is becoming too "hot" which causes the tungsten electrode to break up into small particles which are carried by the shield gas into the weld or whether the arc is becoming too cold, thus causing the welder to touch the tungsten to the work and further causing more tungsten to leave the electrode and become included in the weld. Tungsten inclusions severely limit the mechanical properties, e.g. strength and ductility, of an as deposited weld. With the torch according to the present invention, the welder can, with his thumb, overcome the problem by instantaneously decreasing or increasing the current to the arc, thus minimizing tungsten inclusions.

Furthermore, with a torch according to the present invention, a weler can weld in difficult places and it greatly facilitates "out-of-position welding".

A handle according to the present invention can be adapted to most commercially available torches and to commercial power supplies to achieve the desired result of a hand operated torch handle with full range control.

Referring now to FIG. 1, there is shown a welding torch 10 having a handle 12 and a welding head 14. The welding head 14 shown is for a tungsten inert gas (TIG) welding torch and is fully described in U.S. Pat. No. 3,238,350, in particular, at FIG. 2 which patent specification is incorporated herein by reference. The torch handle 12 has a longitudinal generally cylindrical bore 16 (FIG. 2) which bore receives the projecting fluid conduits 18, 20, 22 of torch head 14 for water cooling and providing shielding gas to the torch head 14 as clearly illustrated in U.S. Pat. No. 3,238,350 and as understood by a worker skilled in the art. The bore 16 facilitates gathering and connection of the fluid conduits, one of which generally includes the electrical leads from the power supply (not shown) to the electrode (not shown) in head 14 as illustrated in the aforementioned patent and as also well known to a worker skilled in the art.

Figure 3:
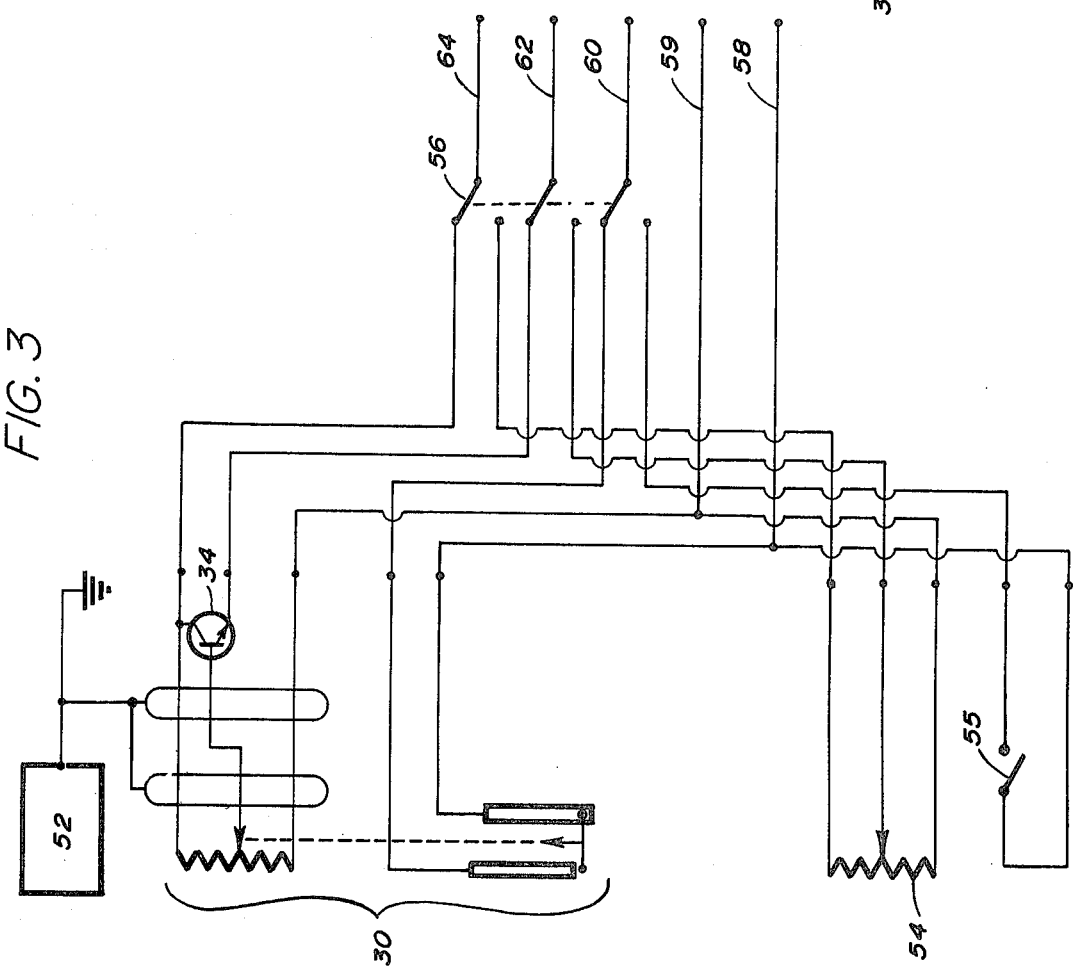
FIG. 3 is a schematic diagram illustrating a typical electrical circuit between a power supply and the electrical components of a torch handle according to FIG. 1.

The top of handle 12 includes a first rectangular-shaped recess 24 and a second rectangular-shaped recess 26, both of which are shown more cleary in FIG. 4. The second recess 26 is closed by a cover 28 by fasteners 29. Disposed within the second recess 26 is a variable control device 30 such as a 10,000 ohm slide potentiometer modified by the addition to its body of two pieces of copper foil strip so that a berylium copper spring, furnished with potentiometer, will make and maintain electrical conduction when the wiper or slide 31, as it is referred to, is moved away from its rearmost position shown as 32 in FIG. 4 thus creating a potentiometer and switch in one unit. There is also room for including a transistor connected to the potentiometer in an emitter-follower circuit to reduce the output impedence of the potentiometer if desired. Recess 26 provides room for the various electrical connections as illustrated in FIG. 3 between the control unit 30 and transistor 34 (FIG. 3). The main electrical conduit 36 to actuate the control is brought into recess 26 through aperture 36 in handle 12. In the forward end of recess 26 is an aperture 38 communicating with forward recess 24. Disposed within aperture 38 is a slide wire 44 which is mounted on button 50. Button 50 slides on rail 40 which is fixed between aperture 42 of recess 24 and the wall 25 between recess 24 and recess 26. Wire 44 is affixed to button 50 which button slides freely on rail 40 along a significant portion of the length of recess 24. A hook 46 formed on the free end of wire 44 engages a suitable aperture on follower 48 of control 30. When assembled as shown in FIG. 2, the button 50 can be manipulated by the thumb of a hand holding handle 12 in its palm. By sliding the button 50 along the tube 40, the control unit 30 can be caused to vary the current in an infinitely variable incremental manner from O to full current flow. Normally, the control is at the O position when the actuator 48 is at end 32 of control unit 30 and at full current flow when in the position shown in FIGS. 1 and 2.

Referring to FIG. 3, there is shown a schematic diagram wherein the control unit 30 (shown as a combination potentiometer and wiper switch), and optional transistor 34 are shown. Transistor 34 is used to minimize interference induced by adjacent electrical conductors. The block 52 represents a steel shield within the torch handle for shielding the potentiometer 30 from induced voltage. The potentiometer 54 and switch 55 shown in FIG. 3 represent at typical foot control for a welding power supply. The switch 56 represents a torch or foot selector switch optionally supplied for use with the handle of the present invention and a standard welding power supply foot control such as shown as 54,55. Conduits 58, 59, 60, 62, and 64 are in turn connected to the welding power spply with 58, 59 connected to the welding current contactor actuation circuit and 60, 62, 64 connected to the current control circuit. With the torch fully assembled and wired as shown in FIG. 3, after an arc is struck between the electrode and the workpiece, the welder can change the current control by merely sliding the button 50 forward or backward using his thumb.

With the device illustrated in FIGS. 1–4, a welder (operator) does not have to interrupt his welding to adjust the current. This is extremely important when working with low melting point materials such as aluminum which becomes very fluid. Common practice when welding aluminum has been to increase the motion of the torch to compensate for the increased fluidity, thus rushinig the weld and making for less than satisfactory weld beads.

It is possible to include an amplifier and one may be required depending upon the power supply being used. However, with the disclosure of the present application, such modification would be apparent to a worker skilled in the art. It is possible to adapt the circuitry shown to silicon controlled rectifier (SCR) trigger circuits, saturable reactor, motor speed, or any other function that can be controlled by variable voltage or current input.

The device of the instant invention can be constructed so it can be added on to an existing torch. For example, the portion of the handle 12 below the recesses 24, 26 can be cut off leaving just the upper portion of bore 16 which would facilitate attaching a handle to an existing torch such as shown in the aformentioned U.S. Pat. No. 3,238,350.

The handle of the instant invention has several unique features which are:

1. There is employed a linear motion electrical device to cause control of the current.
2. The control device is located so that the welder/operator can single-handedly actuate the contactor and vary the welding current without interrupting the weld.
3. The response time to changes in welding conditions during the actual welding operation can be extremely fast, limited only by the welding machine itself.

The control handle is universal in that it may be used with amplifiers, trigger circuits, and the like to control metal inert gas, tungsten inert gas, and plasma welders using silicon control rectifiers, saturable reactors, motor speeds, or other welding parameters.

The handle can be produced in large quantities by simple injection molding processes. The handle is adaptable as an add on to existing torches.

Having thus described may invention, what I desire to be secured by Letters Patent of the United States is set forth in the following claims.

I claim:

1. An arc-welding torch handle comprising in combination:
    a hollow elongate body having a first end and a second end said body being generally cylindrical in cross-section with a generally flat planar top portion having therein a first recess and a second recess in tandem with an aperture therebetween said second recess having as its bottom surface an electrical shielding plate;
    means for mounting a welding torch head including an electrode on the first end of said body and communicating with the hollow interior of said body;
    linearly actuated control means on said body, said control means comprising in combination a linear switch and linear potentiometer both of which are disposed in said second recess in said handle in tandem relationship and activated by a single linear slide;
    a rail mounted linearly slidable thumb activated button mounted in said first recess in said handle said button traversing a linear path of fixed length which path can be fully traversed by a welder's thumb when gripping said body without shifting of the welder's grip;
    means connecting said button to said slide through said aperture between said first and second recesses;
    an insulated cover fully enclosing said second recess;
    said control means being adapted, when connected between a source of welding crrent which is also connected to the electrode of a welding torch head on said body so as to enable the welder to initiate a welding arc by energizing said switch and to continuously vary electrical welding current from a low value welding current to a full source rated welding current flow position.

2. A torch handle according to claim 1 including a transistor connected to said potentiometer in an emitter-follower circuit to reduce the output impedence of said potentiometer.

3. A hand operated welding torch comprising in combination:
    a hollow elongate handle having a torch head secured thereto;
    said handle being generally cylindrical in cross-section with a generally flat planar top portion having therein a first recess and a second recess in tandem with an aperture therebetween, said second recess having as its bottom surface an electrical shielding plate;
    a tungsten electrode disposed with said head surrounded by a nozzle secured to said head;
    means for introducing a shielding gas into said head to surround said electrode;
    linearly actuated electrical control means on said handle, said control means comprising is combination a linear switch and linear potentiometer both of which are disposed in said second recess in said handle in tandem relationship and activated by a single linear slide;
    a rail mounted linearly slidable thumb activated button mounted in said first recess in said handle, and button traversing a longitudinal path of fixed length which path can be fully traversed by a welder's thumb without shifting of the hand when the torch is being used by said welder;
    means connecting said button to said slide through said aperture between said first and second recesses;
    an electrically insulating cover fully enclosing said second recess;
    said control means being adapted, when connected between a source of current connected to said electrode and said electrode, to permit the welder to initiate a welding arc by energizing said switch and to continuously vary electrical current in the electrode from a low value current flow mode to a full source rated welding current flow position.

4. A torch according to claim 3 including fluid conduit means in said handle to water cool a chuck holding said electrode in said torch head.

* * * * *